United States Patent
Emmerling et al.

(10) Patent No.: US 11,192,525 B2
(45) Date of Patent: Dec. 7, 2021

(54) ACCESS ARRANGEMENT FOR A VEHICLE

(71) Applicant: Continental Automotive GmbH, Hannover (DE)

(72) Inventors: Ulrich Emmerling, Kelheim (DE); Annette Hebling, Geisling (DE); Christine Igl, Regensburg (DE); Georg Käufl, Painten (DE); Stefan Hermann, Neunkirchen am Brand (DE); Alexander Heinrich, Donaustauf (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/638,075

(22) PCT Filed: Aug. 9, 2018

(86) PCT No.: PCT/EP2018/071675
§ 371 (c)(1),
(2) Date: Feb. 10, 2020

(87) PCT Pub. No.: WO2019/030342
PCT Pub. Date: Feb. 14, 2019

(65) Prior Publication Data
US 2020/0216031 A1  Jul. 9, 2020

(30) Foreign Application Priority Data
Aug. 11, 2017  (DE) .................... 10 2017 214 105.0

(51) Int. Cl.
*B60R 25/40* (2013.01)
*B60R 25/24* (2013.01)
*G07C 9/00* (2020.01)

(52) U.S. Cl.
CPC ............ *B60R 25/403* (2013.01); *B60R 25/24* (2013.01); *G07C 9/00309* (2013.01);
(Continued)

(58) Field of Classification Search
CPC . B60R 25/24; B60R 25/403; B60R 2325/103; B60R 2325/205; G07C 9/00309
See application file for complete search history.

(56) References Cited

U.S. PATENT DOCUMENTS

| | | | |
|---|---|---|---|
| 5,552,641 A | 9/1996 | Fischer et al. | |
| 2008/0116746 A1* | 5/2008 | Hein | G07C 9/00174 307/10.1 |

(Continued)

FOREIGN PATENT DOCUMENTS

| | | |
|---|---|---|
| CN | 104903158 A | 9/2015 |
| CN | 105389867 A | 3/2016 |

(Continued)

OTHER PUBLICATIONS

International Search Report and Written Opinion dated Nov. 26, 2018 from corresponding International Patent Application No. PCT/EP2018/071675.

(Continued)

*Primary Examiner* — Daniell L Negron

(57) ABSTRACT

An access arrangement for a vehicle comprises a vehicle-side unlocking device for unlocking a locking mechanism. Furthermore, it comprises a vehicle-side rechargeable electrical energy storage device which is set up to supply the unlocking device with energy independently of the on-board power supply of the vehicle. Moreover, the access arrangement has a vehicle-side energy supply device comprising a first section for receiving wirelessly transmitted energy and for converting the transmitted energy into electrical energy, and a second section for charging the vehicle-side rechargeable electrical energy storage device. In particular, the access arrangement also comprises a vehicle-side authentication device for checking access authorization, which is supplied with energy independently of the on-board power supply by means of the vehicle-side rechargeable electrical (Continued)

energy storage device. It is therefore no longer necessary to equip a mobile identification transmitter carried by a user with the access arrangement with a mechanical key.

12 Claims, 1 Drawing Sheet

(52) U.S. Cl.
CPC ... *B60R 2325/103* (2013.01); *B60R 2325/205* (2013.01); *G07C 2009/00642* (2013.01)

(56) References Cited

U.S. PATENT DOCUMENTS

| | | |
|---|---|---|
| 2011/0260831 A1 | 10/2011 | Ieda et al. |
| 2012/0108168 A1 | 5/2012 | Metivier |
| 2014/0316612 A1 | 10/2014 | Banter et al. |
| 2015/0248801 A1 | 9/2015 | Froitzheim et al. |
| 2017/0089104 A1 | 3/2017 | Kowalewski et al. |
| 2017/0101076 A1 | 4/2017 | Krishnan |

FOREIGN PATENT DOCUMENTS

| | | |
|---|---|---|
| CN | 206107187 U | 4/2017 |
| DE | 4329697 C2 | 3/1995 |
| DE | 102004007721 A9 | 5/2005 |
| DE | 102006002119 A1 | 7/2006 |
| DE | 102008027160 A1 | 12/2009 |
| DE | 112013000504 T5 | 10/2014 |
| DE | 202016105621 U1 | 11/2016 |
| EP | 1564689 A2 | 8/2005 |
| EP | 1703472 B2 | 9/2006 |
| GB | 2496503 A | 5/2013 |
| WO | 2010/125306 A2 | 11/2010 |
| WO | 2014/081451 A2 | 5/2014 |

OTHER PUBLICATIONS

Office Action dated Mar. 20, 2018 from corresponding German Patent Application No. DE 10 2017 214 105.0 showing German patent examiner's application of references listed therein to claims with features similar to those in the instant application. Machine translation into English is attached.

* cited by examiner

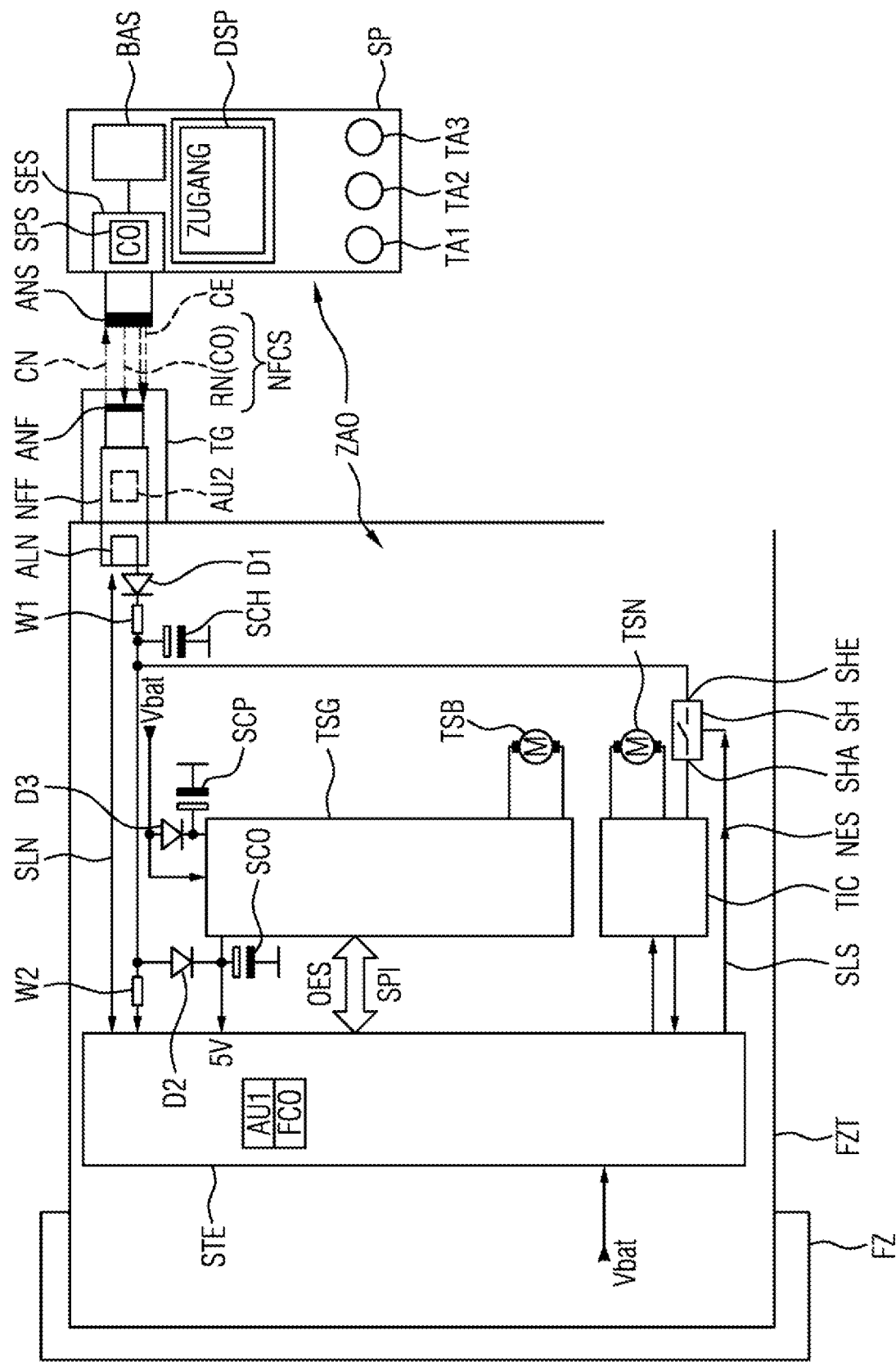

ACCESS ARRANGEMENT FOR A VEHICLE

The present invention relates to an access arrangement for a vehicle, in particular in order to be able to carry out emergency unlocking of the vehicle in the event of failure of the vehicle electrical system. The invention further relates to a vehicle with an access arrangement just mentioned.

In order to prevent unauthorized access to a vehicle, particularly a motor vehicle, modern access authorization systems or access arrangements in vehicles use electronic security systems, in which to authenticate a user data communication takes place between a first communication device of the vehicle and a second communication device in a mobile identification transmitter of the user, such as a key or a key fob. In this case, in an active access arrangement of the mobile identification transmitter, control signals and an identification signal are transmitted to the vehicle, for example by the user of the mobile identification transmitter pressing a corresponding button, whereupon this vehicle is unlocked or locked if the identification code is correct.

In what is known as a passive access arrangement, request signals with a certain field strength are initially emitted at regular time intervals by a first communication device of the vehicle, in order to check whether a mobile identification transmitter is located in a proximity region or in an access region (unlock zone) around the vehicle. If a mobile identification transmitter approaches the vehicle and is finally able to receive the request signals thereof, it will respond to the reception of a request signal in order to initiate an authentication process. In this case, data messages are exchanged, in which the mobile identification transmitter ultimately communicates its authentication code in the vehicle. If the authentication code is checked successfully, it is then possible that a user, who is located directly at the vehicle in the access region, initiates unlocking of the corresponding vehicle door or all vehicle doors by actuating a door handle. As no active actuation of a mechanical or electrical identification transmitter or key by a user has to take place here, this type of access authorization checking is also termed passive access authorization checking and the corresponding access authorization systems are termed passive electronic access authorization systems or passive access arrangements.

As just mentioned, it is necessary, particularly for passive access arrangements, for a vehicle-side communication device to send out signals to the mobile identification transmitter of the user. However, this is no longer possible in the case where the electrical system of the vehicle (fed by a vehicle battery) fails, said system generally supplying the vehicle-side communication device with energy. One possibility for failure can stem from the fact that the vehicle battery supplying the on-board electrical system is drained or no longer provides a sufficient voltage. For this purpose, it is conceivable to provide a mobile identification transmitter with a mechanical emergency key which makes it possible to open the vehicle by way of a mechanical closing device on the vehicle. In order that the closing device can be opened manually, such an emergency key can have, alongside the key bit, a sufficiently large key head in order that the torque required for opening the closing mechanism can be applied. However, a key head dimensioned in this way takes up a considerable structural space in the identification transmitter, with the result that, disadvantageously, the dimensions of the identification transmitter are crucially determined and enlarged by said emergency key or key head. Such a volume of an identification transmitter is usually undesirable, however, since in many cases the identification transmitter will also be kept in pockets of a user's clothes and thus result in the pockets becoming baggy.

The object of the present invention is therefore to create a possible way of providing access to the vehicle in the event of failure of the vehicle-side power supply even without an emergency key.

This object is achieved by means of the subjects of the independent claims. The dependent claims relate to advantageous configurations.

According to a first aspect, an access arrangement for a vehicle, in particular a motor vehicle, comprises a vehicle-side unlocking device for actuating, in particular unlocking, a locking mechanism of the access arrangement. Furthermore, it comprises a vehicle-side rechargeable electrical energy storage device which is set up to supply the unlocking device with energy. Here the vehicle-side rechargeable electrical storage device is in particular not connected to the on-board power supply of the vehicle, but is independent of it. In addition, the access arrangement comprises a vehicle-side energy supply device with a first section for receiving wirelessly transmitted energy and for converting the transmitted energy into electrical energy, and with a second section for charging the vehicle-side rechargeable electrical energy storage device. In this way, it is possible for the vehicle to be unlocked even in the event that the power supply in the vehicle fails, since energy can be transmitted wirelessly to the energy supply device for (emergency) operation of the vehicle-side unlocking device, so that the latter then charges the vehicle-side rechargeable electrical energy storage device to supply the unlocking device.

Furthermore, to increase security, the access arrangement also has a vehicle-side authentication device for checking and implementing access authorization. In this context, it is conceivable that the vehicle-side rechargeable electrical energy storage device is set up to supply both the authentication device and the unlocking device (in particular independently of the on-board power supply of the vehicle) with energy. This means that even if the power supply of the vehicle fails, both the authentication device and the unlocking device can be operated by charging a single vehicle-side rechargeable electrical energy storage device, and in such an emergency situation a user can get into the interior or the passenger compartment of the vehicle.

It is conceivable here that the vehicle-side energy supply device or at least the first section of the energy supply device is attached to the outside of the vehicle or is attached in such a way that energy can be transmitted wirelessly from the outside of the vehicle (with high efficiency) to the first section.

In addition, the vehicle-side energy supply device is set up in such a way that the vehicle-side rechargeable electrical energy storage device is initially only charged with the amount of energy that allows the vehicle-side authentication device to check the access authorization. If a check of the access authorization gives a positive result, the vehicle-side energy supply device can further charge the vehicle-side rechargeable electrical energy storage device, in particular up to a state of charge at which at least actuation of the vehicle-side unlocking device and thus unlocking is possible.

According to one configuration of the access arrangement, the vehicle-side rechargeable electrical energy storage device can comprise a (chargeable) rechargeable battery. However, it is also conceivable for it to have a capacitor, in particular in the form of a supercapacitor or ultracapacitor, which in particular has a high power density and can be quickly charged and discharged.

According to a further configuration of the access arrangement, the vehicle-side energy supply device has a radio interface. It is conceivable here for such a radio interface to be designed as a low-frequency radio interface that operates at frequencies of approximately 125 kHz. In particular, however, it is also conceivable for such a radio interface to be designed in the form of a short-range interface or NFC (Near Field Communication) interface in order to receive energy transmitted wirelessly by radio. As will be explained in yet more detail later, such energy can be provided by an identification transmitter assigned to the access arrangement.

According to a further configuration, the vehicle-side energy supply device can also comprise a light interface; it is conceivable here, in particular, for this light interface to be designed in the form of a photocell (solar cell) in order to receive energy transmitted wirelessly by means of light, in particular from an identification transmitter assigned to the access arrangement. In this case, the light can come from a luminous means of the identification transmitter, such as an LED (Light Emitting Diode). In particular when the mobile identification transmitter is designed as a mobile phone or smartphone, an activated flashlight function or flash function can be used to provide the light used for the energy supply. Alternatively, the energy could also come from another light source, for example a separate flashlight or even the sun. If sunlight is used, it is also conceivable for authentication and/or unlocking to be able to take place if both the vehicle and the identification transmitter no longer have a sufficient battery charge. In this case, the user must then wait until the sun is shining or until the sun has used a vehicle-side photocell/solar cell, as the first section of the energy supply device, to charge the vehicle-side rechargeable energy storage device with sufficient energy. In addition to energy transmission, light could also be used for communication for an authentication process. In particular, light in the infrared (IR) range is also possible here.

According to a further configuration of the access arrangement, the vehicle-side authentication device for implementing the access authorization outputs an unlock signal to the vehicle-side unlocking device for unlocking a locking mechanism. In particular, it is assumed here that checking by the authentication device has given a positive result. For example, this means that a mobile identification transmitter assigned to the access arrangement has sent its code to the authentication device for the authentication check, this code being compared with a code stored in the authentication device and a match of the transmitted code and the stored code resulting in a positive authentication result, and then in particular in unlocking.

According to a further configuration, the access arrangement also comprises a mobile identification transmitter for outputting or providing the energy to be wirelessly transmitted to the vehicle-side energy supply device. This mobile identification transmitter can be configured in such a way that it can be carried with or by a user and is designed as a key, a key fob, a mobile phone, in particular a smartphone (intelligent telephone), or as a fitness tracker (fitness monitoring device, particularly worn around the wrist) etc. In this way, the user can, for example, also use an object of his daily life to carry out emergency unlocking of the vehicle.

It is also conceivable for the mobile identification transmitter, with which the emergency unlocking is possible, to also be set up to communicate with the vehicle-side authentication device in order to authenticate the mobile identification transmitter by means of the access arrangement or the vehicle. As already described above, authentication can take place by exchanging one or more identification codes between the mobile identification transmitter and the vehicle-side authentication device and comparing it/them with predetermined or stored codes.

According to a further aspect of the invention, a vehicle with an access arrangement described above or a configuration thereof is provided. In this case, the vehicle can have at least one vehicle door in which the components of the access arrangement are arranged. It is also conceivable for the vehicle door to have a door handle in which the vehicle-side energy supply device or at least the first section of the vehicle-side energy supply device is provided.

Details and advantageous configurations of the access arrangement described above can also be regarded as advantageous configurations of the vehicle, and vice versa, insofar as they can also be applied to the vehicle.

Exemplary embodiments of the present invention will now be explained in more detail below with reference to the accompanying drawing. In the drawing:

FIG. 1 shows a schematic illustration of the essential components of an access arrangement according to an embodiment of the invention.

Reference shall now be made to FIG. 1, which shows an access arrangement ZAO designed for application in a vehicle, in particular a motor vehicle. In this case, the access arrangement ZAO comprises a vehicle-side part accommodated in the vehicle FZ, in particular in a door FZT of the vehicle. As can be seen on the right-hand side of the FIGURE, the access arrangement ZAO furthermore has a mobile part formed by a mobile identification transmitter, here in the embodiment of a smartphone (intelligent phone) SP.

During normal or proper operation of the access arrangement, during which a vehicle-side battery (not illustrated) supplies an on-board electrical system with current, with the result that the essential components are supplied with the battery voltage Vbat, a vehicle-side control device STE (for example in the form of a microcontroller) will send a signal to a vehicle-side transmitting/receiving device via a control line SLN, said transmitting/receiving device then emitting request signals at regular time intervals. In the present case, the vehicle-side transmitting/receiving device is an NFC module or an NFC reader NFF, which is incorporated at least partly in a door handle TG of the vehicle door FZT. Said NFC reader NFF will then send out radio signals, in particular with a short range of approximately 10 cm, as request signals CN. In this case, these radio signals for request and also as response are in a frequency range of 13.56 MHz in accordance with an NFC standard.

If there is now a radio counterpart, such as the smartphone SP, within the range of the request signals CN, it will respond to these request signals with one or more response signals RN. In order to exchange these request and response signals, on the vehicle side there is the vehicle-side (NFC) antenna ANF and on the part of the smartphone SP there is the smartphone-side (NFC) antenna ANS, which together form an NFC interface NFCS.

The request signals CN are received by the smartphone-side antenna ANS and conducted to a smartphone-side transmitting/receiving device SES. The latter comprises a storage device SPS, in which an identification code CO is stored. Said code is packaged into a response signal RN by the transmitting/receiving device SES, with the result that the identification code CO is transmitted back to the vehicle, more precisely to the antenna ANF. From there, the code is conducted once again via the control line SLN to the vehicle-side control device STE, and there it is checked by an authentication section AU1. During this check, the identification code CO is compared with a code FCO stored in the authentication section AU1, wherein a positive result is obtained in the event of correspondence of the code.

In the event of a positive result of the check of the identification code CO being obtained, the control device STE outputs, via a vehicle bus SPI, a corresponding unlocking signal OES for proper unlocking to a door control unit TSG. In this case, the vehicle bus can be for example a so-called serial peripheral interface (SPI) bus.

The door control unit TSG is supplied, as indicated, with the battery voltage Vbat by a vehicle-side battery via the vehicle electrical system or a vehicle-side power supply. In this case the supply can take place directly or via a buffered input having a diode D3 and a buffer capacitor SCP. If the door control unit TSG receives the proper unlocking signal OES, then it will drive a motor TSB of a door lock of the vehicle door in order to unlock the vehicle door or a corresponding locking mechanism. It is also conceivable that, besides the door control unit TSG of the vehicle door FZT, further door control units are caused to unlock the corresponding door locks of further vehicle doors, and thus to allow a user to have access to the vehicle or to the passenger compartment.

Besides this normal or proper operation that takes place if the vehicle battery makes enough energy available, emergency operation is also conceivable in accordance with one embodiment of the present invention.

For this purpose of initiating emergency operation, reference shall now be made once again to the smartphone SP as a mobile identification transmitter of a user. Said smartphone SP is able to implement a plurality of software-based applications (or apps). By way of example, it is conceivable that a corresponding application can be started by means of one of the three buttons TA1, TA2 or TA3. In this case, the buttons can be embodied as mechanical buttons or as so-called soft keys (touch-sensitive sections of a display device). For monitoring and for overview for a user, the smartphone SP furthermore comprises a display DSP, on which information concerning the application currently being executed can be seen. By way of example, it is conceivable that, as a result of the button TA1 being actuated, an application having the name "Access" is started and implemented, wherein the implementation of the application "Access" is confirmed precisely on the display DSP. This is conceivable not only for emergency operation but also for proper operation that has been described above.

While it is possible that during proper operation, after the "access" application has been started, the smartphone SP has to be held against the door handle TG in order to exchange radio signals, it is conceivable that, during emergency operation, a user actuates the button TA2, for example, in order to activate emergency operation. However, it is also conceivable for the smartphone-side transmitting/receiving device SES to activate emergency operation independently, for example if it has not received a request signal CN from the vehicle-side antenna ANF within a specific time interval after the starting of the application "Access".

It is now assumed that the emergency operating function in the smartphone SP has been activated in one of the ways described above. Moreover, it is assumed, as shown in FIG. 1, that the smartphone SP is brought into the vicinity of the door handle TG by the user. In this case, the smartphone-side transmitting/receiving device SES fed by a smartphone-side battery BAS will then transmit electromagnetic energy in the form of the radio signals CE in the direction of the vehicle-side antenna ANF. Said antenna thus serves as a first section of a vehicle-side energy supply device for receiving wirelessly transmitted energy and for converting the transmitted energy into electrical energy. The NFC reader NFF, which can be regarded as the vehicle-side energy supply device, in emergency operation, is then not operated as a reader, but rather in a transponder mode, in which it receives energy supplied (from the outside).

The NFC reader NFF furthermore has a second section ALN, which serves to charge a vehicle-side rechargeable electrical energy storage device SCH in the form of a supercapacitor or ultracapacitor via a diode D1 and a resistor W1. In the example, said supercapacitor SCH has a voltage of 5 volts and a capacitance of 3.3 F.

While the smartphone-side transmitting/receiving device SES transmits high-energy radio waves CE in the direction of the antenna ANF at regular (in particular short) time intervals (e.g. at intervals of 300-400 ms or else permanently for a specific time), this energy is converted further and the supercapacitor SCH is thereby charged. If a specific first state of charge is attained, then the vehicle-side control device STE can be supplied with sufficient voltage via a resistor W2. For a stable voltage supply over a specific time interval, it is also conceivable and merely optional to charge via the supercapacitor SCH a further capacitor, in particular embodied as a supercapacitor SCO, which is responsible only for safe or proper operation of the vehicle-side control device STE.

Since, as stated, the operation of the vehicle-side control device STE is then ensured either via the supercapacitor SCH or the supercapacitor SCO or by both supercapacitors, said vehicle-side control device can thus begin to initiate an authentication process vis-à-vis the smartphone SP. For this purpose, as above with regard to proper operation, via the control line SLN, a corresponding signal can be output to the NFC reader NFF, which thereupon begins with an exchange of request signals CN and response signals RNO and a corresponding exchange of the identification code CO. The identification code CO transmitted by the smartphone SP can then be checked again by the authentication section AU1. In this way, it is then conceivable that an authentication device in the form of the vehicle-side control device STE having the corresponding authentication section AU1 can be operated, despite failure of the on-board supply voltage, as a result of the charging of corresponding vehicle-side rechargeable electrical energy stores (SCH, SCO).

It is then conceivable that even during the authentication process or independently thereof, the smartphone SP continues charging the supercapacitor SCH further by way of the radio signals CE, in particular with the purpose that said supercapacitor stores a sufficient amount of energy to carry out an emergency unlocking of the vehicle door FZT. However, it is also conceivable that the vehicle-side control device STE, after the activation, firstly carries out an authentication process vis-à-vis a smartphone and permits further charging of the supercapacitor SCH only in the event of a positive checking result (when it is established that the smartphone SP is associated with the access arrangement ZAO).

Independently of the way in which further charging of the supercapacitor SCH has occurred, it is then assumed that said supercapacitor has a state of charge sufficient to enable it to be used for an emergency unlocking. For this purpose, the vehicle-side control device STE is configured to constantly monitor the state of charge of the supercapacitor SCH. If there is then a first condition that an authentication of a smartphone SP placed against the door handle TG was positive, and if the further condition is present that the supercapacitor SCH has a sufficient state of charge, then the vehicle-side control device STE will output, via a control line SLS, an unlocking signal NES for emergency operation at a switch SH. Said switch, at whose input SHE the voltage of the supercapacitor SCH is present and whose output is connected to a driver circuit TIC, is closed by the unlocking signal for emergency operation NES, with the result that the energy stored in the supercapacitor passes to the driver circuit TIC. By way of the driver circuit TIC, a corresponding actuator or motor TSN will then carry out unlocking of the door lock or of a corresponding locking mechanism in order thus, even in the case of emergency operation, to achieve unlocking of the vehicle door FZT and to allow a user to have access to the interior of the vehicle.

It should once again be noted, finally, that in accordance with an access arrangement ZAO of the invention, a mechanical emergency key is no longer necessary in a mobile identification transmitter. On the other hand, it is conceivable to enable emergency unlocking even in the event of total failure of the on-board power supply of the vehicle. As a result of the charging of the supercapacitor SCH, therefore, both a vehicle-side authentication device in the form of the vehicle-side control device STE with its authentication section AU1 and a vehicle-side unlocking device in the form of the switch SH, the driver TIC and the actuator TSN are supplied with energy. In this way, the construction of the emergency device in terms of apparatus technology can be minimized since, in the minimum case, it is merely necessary to realize the supercapacitor SCH as a vehicle-side rechargeable electrical energy storage device. Furthermore, the complexity in terms of method technology with regard to maintenance is also low since the supercapacitor does not have to be charged regularly during vehicle operation or a vehicle service in the workshop, but rather can be charged as necessary in the case of an emergency. Finally, as an advantage of the access arrangement in accordance with the embodiment of the present invention, it should be mentioned that for charging the supercapacitor SCH in emergency operation, it is possible to use an implement which is used by a user in daily life and which the user generally carries with himself/herself in a state ready for operation.

The invention claimed is:

1. An access arrangement for a vehicle, comprising:
a vehicle-side unlocking device configured to actuate a locking mechanism;
a vehicle-side rechargeable electrical energy storage device configured to supply the unlocking device with energy;
a vehicle-side energy supply device comprising:
a first section configured to receive wirelessly transmitted energy and to convert the transmitted energy into electrical energy, and
a second section configured to charge the vehicle-side rechargeable electrical energy storage device,
a vehicle-side authentication device configured to check and implement access authorization,
wherein the vehicle-side rechargeable electrical energy storage device is configured to supply both the authentication device and the unlocking device with energy, and
wherein the vehicle-side energy supply device is configured in such a way that the vehicle-side rechargeable electrical energy storage device is initially charged only with an amount of energy that allows the vehicle-side authentication device to check the access authorization, and
only upon the access authorization having been checked as positive, the vehicle-side energy supply device further charges the vehicle-side rechargeable electrical energy storage device with an amount of energy that allows the unlocking device to actuate the locking mechanism.

2. The access arrangement as claimed in claim 1, wherein the vehicle-side rechargeable electrical energy storage device comprises at least one of a rechargeable battery and a capacitor.

3. The access arrangement as claimed in claim 2, wherein the vehicle-side rechargeable electrical energy storage device comprises a supercapacitor.

4. The access arrangement as claimed in claim 1, wherein the vehicle-side energy supply device comprises a radio interface configured to receive energy transmitted wirelessly by radio.

5. The access arrangement as claimed in claim 4, wherein the radio interface comprises an NFC interface.

6. The access arrangement as claimed in claim 1, wherein the vehicle-side energy supply device comprises a light interface configured to receive energy transmitted wirelessly via light.

7. The access arrangement as claimed in claim 6, wherein the light interface comprises a photocell.

8. The access arrangement as claimed in claim 1, wherein the vehicle-side authentication device configured to implement the access authorization outputs an unlock signal to the vehicle-side unlocking device configured to unlock the locking mechanism.

9. The access arrangement as claimed in claim 1, further comprising a mobile identification transmitter configured to output the energy to be wirelessly transmitted to the vehicle-side energy supply device.

10. The access arrangement as claimed in claim 9, wherein the mobile identification transmitter is configured to carry out authentication with the vehicle-side authentication device.

11. The access arrangement as claimed in claim 9, wherein the mobile identification transmitter is configured as at least one of a key, a key fob, a mobile phone, a smartphone and a fitness tracker.

12. The vehicle with the access arrangement as claimed in claim 1.

* * * * *